United States Patent [19]

Gerlinger

[11] 4,198,805
[45] Apr. 22, 1980

[54] HAYMAKING MACHINE

[75] Inventor: Frédéric Gerlinger, Ottersthal, France

[73] Assignee: Kuhn, S.A., Saverne, France

[21] Appl. No.: 874,643

[22] Filed: Feb. 2, 1978

[30] Foreign Application Priority Data

Feb. 18, 1977 [FR] France ................. 77 05330

[51] Int. Cl.² .......................................... A01D 79/00
[52] U.S. Cl. ..................................................... 56/370
[58] Field of Search .................. 56/365, 366, 370, 377

[56] References Cited

U.S. PATENT DOCUMENTS

| | | | |
|---|---|---|---|
| 3,546,867 | 12/1970 | Hauser-Lienhard | 56/370 |
| 3,546,868 | 12/1970 | Hauser-Lienhard | 56/377 |
| 3,975,892 | 8/1976 | Hellkuhl | 56/365 |

FOREIGN PATENT DOCUMENTS 450793  4/1968  Switzerland ................. 56/370

Primary Examiner—Russell R. Kinsey
Attorney, Agent, or Firm—Young & Thompson

[57] ABSTRACT

The disclosure is of a haymaking machine with a rotary rake head and a control mechanism for adjustable tool-carrier arms which are mounted for pivoting in support bearings which are wedged between two covers, one of which is situated above the control mechanism of the tool-carrier arms and is fast with the drive hub of the rotary rake head, and the other of which is situated below the said control mechanism of the tool-carrier arms.

7 Claims, 3 Drawing Figures

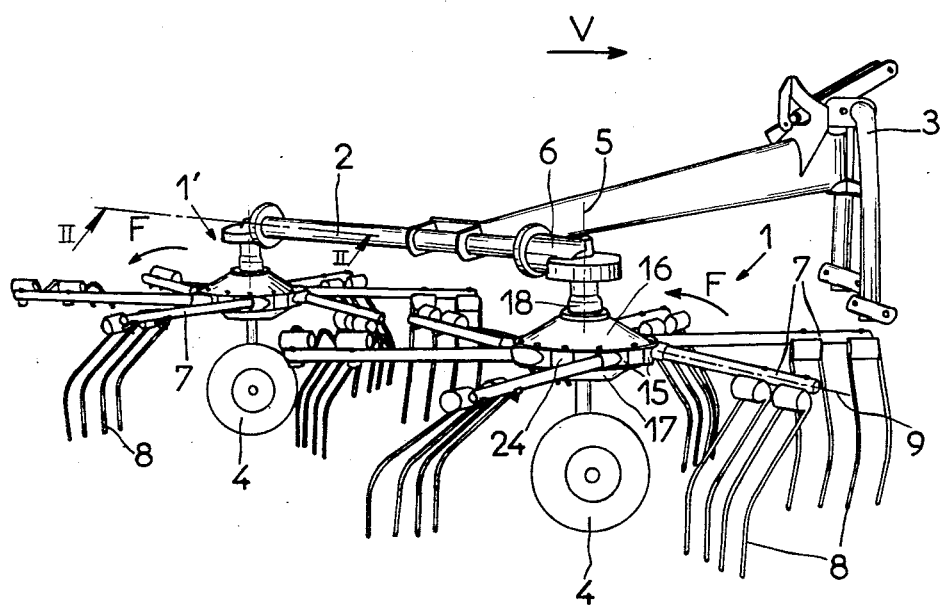
Fig: 1

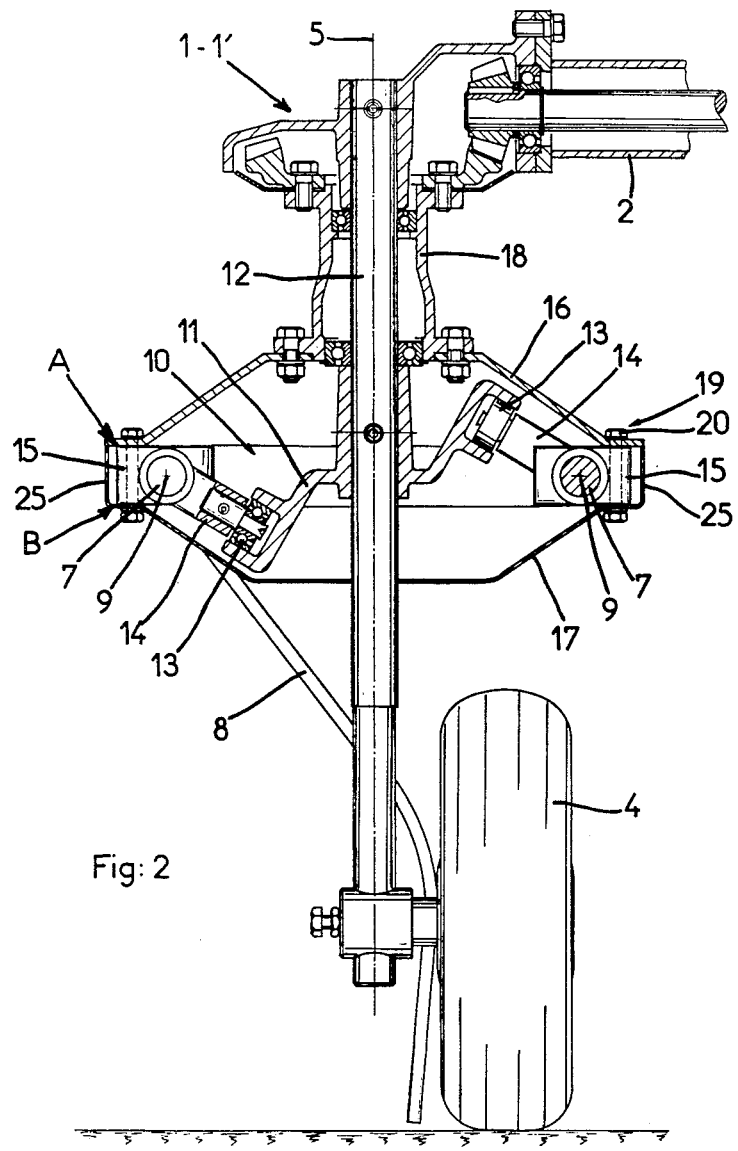
Fig: 2

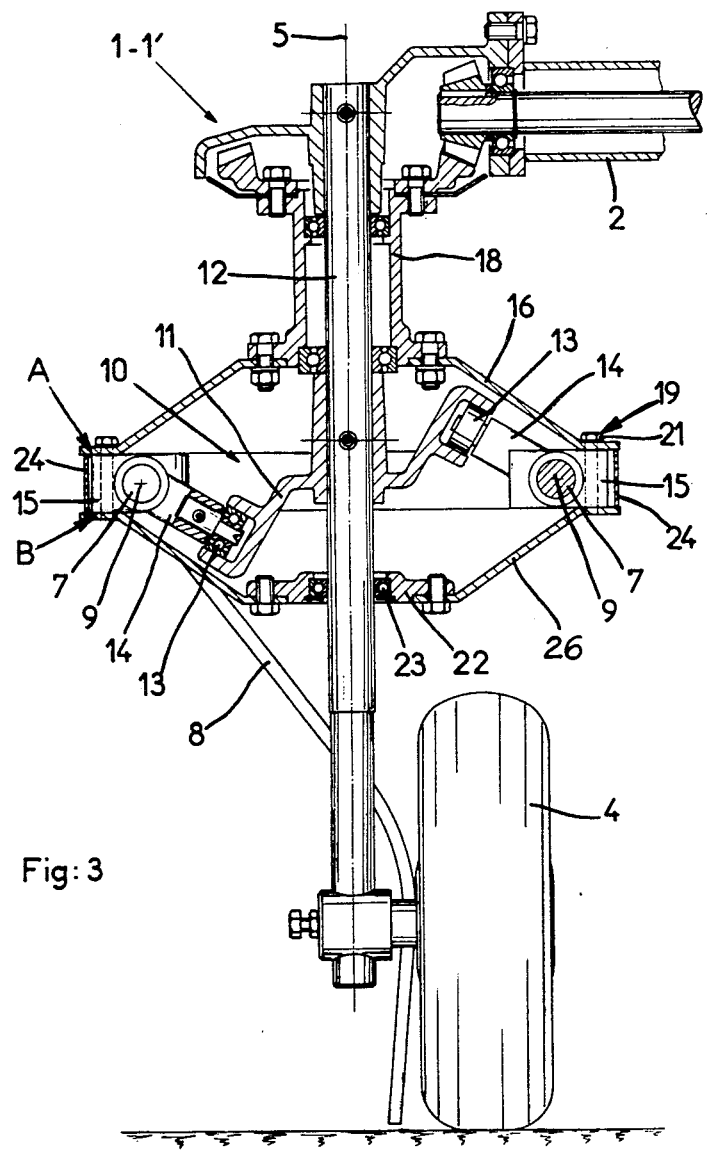
Fig: 3

HAYMAKING MACHINE

INTRODUCTION AND BACKGROUND OF THE INVENTION

The present invention relates to a haymaking machine intended especially for the windrowing of fodder, comprising at least one rotary rake head driven in rotation about a substantially vertical axis and provided with a plurality of tool-carrier arms which extend outwardly from adjacent that axis and can oscillate about their longitudinal axes under the action of a control mechanism, in such manner as to cause the working tools to pivot, in a partial zone of their trajectory, upwards and in the direction opposite to the direction of rotation of the rotary rake head in order to favour the disengagement of the fodder from the said working tools for the formation of a windrow.

In some known machines of this kind the tool-carrier arms are mounted for pivoting in support bearings fixed on the outer edge or against the lower face of a support of frusto-conical form. This form of embodiment possesses a plurality of drawbacks among which mention may be made especially of the lack of rigidity and the great vulnerability of the control device of the tool-carrier arms. The said lack of rigidity derives essentially from the fact that the support bearings of the tool-carrier arms have no lower support, that is on the side towards the ground. Moreover, since the control mechanism of the tool-carrier arms is entirely uncovered on its lower face, it is exposed to dust, pebbles, fodder particles and other foreign bodies coming from the ground surface. These can rapidly cause fouling and deterioration of the said control mechanism of the tool-carrier arms.

In other known machines of this kind the support bearings of the tool-carrier arms are fixed on moulded casing which encloses the control mechanism of the said tool-carrier arms. These casings necessitate numerous very delicate machinings for the adaptation of the support bearings of the tool-carrier arms. This machining can be effected only at the cost of numerous manipulations involving considerable losses of time or extremely costly transfer machines.

Finally on other known machines of this kind the support bearings of the tool-carrier arms are moulded with the casings enclosing the control mechanism of the tool-carrier arms and form integral parts of the said casings. This form of embodiment presents substantially the same machining problems as the abovementioned example. Furthermore another major drawback of this form of embodiment is that when one of the support bearings of the tool-carrier arms has deteriorated, for example as a result of an impact of a tool-carrier arm against an obstacle such as a tree, it is necessary to replace the whole casing, which by its design is a very burdensome part.

The objective of the present invention is to produce a haymaking machine of the type described in the introduction which is relatively cheap and does not possess the above-mentioned drawbacks of the known machines.

BRIEF SUMMARY OF THE INVENTION

This objective is obtained in accordance with the invention by wedging the support bearings of the tool-carrier arms between two covers one of which is situated above the control mechanism of the tool-carrier arms and is fixed on the drive hub of the rotary rake head and the other is situated below the said control mechanism of the tool-carrier arms.

FURTHER DESCRIPTION AND ADVANTAGES OF THE INVENTION

These two covers and the support bearings of the tool-carrier arms are assembled by means of assembly elements which, according to a preferred manner of assembly, can pass from side to side through the said covers and the support bearings of the tool-carrier arms.

By virtue of this arrangement the support-bearings of the tool-carrier arms are supported simultaneously from above and below, which imparts very great rigidity to them. Furthermore these two covers ensure perfect protection against the arrival from above or below of foreign bodies in the control mechanism of the tool-carrier arms.

Moreover this arrangement of the support bearings of the tool-carrier arms between two covers requires no delicate machining for the adaptation of the said support bearings. The surfaces of the two covers and the surfaces of the support bearings which come into contact with one another do not necessitate particular adjustment.

This arrangement further permits of varying the number of support bearings mounted on a rotary rake head, while utilising the same covers, which permits rationalisation as regards the production of these covers.

The invention will be explained in greater detail hereinafter, with further characteristics and advantages, in the description of a non-limitative example of embodiment of the invention given with reference to the accompanying drawings.

BRIEF DESCRIPTION OF THE VIEWS IN THE DRAWINGS

In the said drawings:

FIG. 1 represents an overall view of the machine according to the invention,

FIG. 2 represents on an enlarged scale a vertical section of a rotary rake head of the machine according to section line 11—11 on FIG. 1, FIG. 3 represents a vertical section of a variant of embodiment of the rotary rake head according to FIG. 2.

DETAILED DESCRIPTION OF THE PREFERRED EMBODIMENTS

In the drawings, the haymaking machine especially intended for the windrowing of fodder as represented in FIG. 1 comprises by way of non-limitative example two rotary rake heads 1 and 1' which are interconnected by a transverse support chassis 2. This machine can be coupled to a towing tractor (not shown) for example by means of a three-point hitch device 3. During normal operation the machine can rest on the ground by means of wheels 4 which are disposed beneath the rotary rake heads 1 and 1'. Each of these rotary rake heads 1 and 1' is driven in rotation about a substantially vertical axis 5 so as to rotate in the direction of the arrow F. This drive is effected by means of elements (not shown) extending from the power take-off of the tractor to the rotary rake heads 1 and 1', passing through the gear box 6.

Each rotary rake head 1 and 1' is provided with a plurality of arms 7 carrying working tools 8 such as forks, tines or analogous elements. These tool-carrier arms 7 extend outwardly from adjacent said axis and can oscillate about their longitudinal axes 9 under the action of a control mechanism 10 in such manner as to cause the working tools 8 to pivot, over a partial zone of their trajectory, upwards and in the direction opposite to the direction F of rotation of the corresponding rotary rake head. In FIGS. 2 and 3 it can be seen that this control mechanism 10 is composed of a guide cam 11 having a track which is mounted on the support spindle 12 of each of the rotary rake heads 1 and 1' and in which rollers 13 mounted on control cranks 14 move, said cranks being fixed to the inner extremities of the tool-carrier arms 7 and cause the latter to oscillate as described above, during the rotation of the rotary rake heads 1 and 1'.

The said pivoting of the working tools 8 favours the clearance of the fodder from the said tools for the formation of a windrow. In the case of a machine having two rotary rake heads 1 and 1' as represented in FIG. 1, the fodder can be transmitted from one rotary rake head to the other in such manner as to form a lateral windrow on one side of the machine. To further the said movement of the fodder the rotary rake heads 1 and 1' can be staggered towards the rear in relation to one another—seen in the direction of travel V of the machine.

In accordance with the present invention the tool-carrier arms 7 are mounted for pivoting in support bearings 15, which support bearings 15 are wedged between two covers 16 and 17, one of which is situated above the control mechanism 10 of the tool-carrier arms 7 and is fixed on the drive hub 18 of the rotary rake head 1 and 1', and the other of which is situated below the said control mechanism 10 of the tool-carrier arms 7. These two covers 16 and 17 support the support bearings 15, one from above and the other from below, ensuring great rigidity and good resistance to shocks for these bearings. Moreover, since these covers 16 and 17 are situated on either side of the control mechanism 10, they ensure a complete protection against dust, pebbles, hay particles or analogous elements which could cause fouling or deterioration of the mechanism.

The two said covers 16 and 17 and the support bearings 15 of the tool-carrier arms 7 are assembled by means of assembly elements 19 which pass through the said covers 16 and 17 and the said support bearings 15 from side to side. These assembly elements 19 can be constituted by bolts 20 or screws 21 disposed substantially parallel with the rotation axis 5 of the rotary rake head 1, 1'. The said assembly elements 19 are preferably situated close to the outer edges of the covers 16 and 17. For an assembly of good quality it is advantageous to provide two bolts 20 or two screws 21 for each support bearing 15.

The two covers 16 and 17 and the support bearings 15 thus form a compact assembly while permitting the tool-carrier arms 7 to pivot about their respective longitudinal axes 9 during working. Since the fitting of a support bearing 15 of a tool-carrier arm 7 requires very little machining in each cover 16 and 17, the same covers can be used for rotary rake heads having a different number of tool-carrier arms 7. This assembly further permits of individually changing each of the support bearings 15 in the case where one of them suffers any deterioration.

According to one important characteristic of the invention the two covers 16 and 17 are substantially in the form of cone frusta having their major respective bases A and B facing one another. These two covers 16 and 17 thus define a volume in which the control mechanism 10 of the tool-carrier arms 7 is advantageously disposed. Moreover this frusto-conical form increases the rigidity of the covers 16 and 17. These frustoconical covers 16 and 17 can be obtained by pressing or moulding.

Since the upper cover 16 is made fast with the drive hub 18 of the rotary rake head 1, 1', it further ensures the rotational drive of the tool-carrier arms 7. It is therefore subjected to greater thrust than the lower cover 17 and it can advantageously have a greater thickness than the said lower cover 17 in order to increase its rigidity.

In the variant of embodiment as represented in FIG. 3 the lower cover 26 is guided in rotation on the support spindle 12 of the rotary rake head 1, 1' by means of a support ring 22 and a ball bearing 23. This arrangement on the one hand permits of increasing the rigidity of the assembly of the support bearings 15 of the tool-carrier arms 7 and on the other hand permits of obtaining better distribution of the stresses in the case of impact of a tool-carrier arm 7 against an obstacle. In this case the two covers 16 and 26 can be substantially identical, which permits standardisation of material and tools serving for the obtaining of the said covers.

According to another characteristic of the invention the intervals between the support bearings 15 of the tool-carrier arms 7 can be closed for example by means of cross-pieces 24 wedged between the two covers 16 and 26 (FIG. 3) or substantially vertical lugs 25 fast with one of the said covers 16 or 17 (FIG. 2). This characteristic permits of avoiding any penetration of foreign bodies within the volume defined by the two covers 16 and or 26 and of having the control mechanism work in a grease bath in order to improve its operation.

The present invention is not limited to machines of the kind as described above and represented in FIG. 1, but is equally applicable to machines which comprise only one single rotary rake head, and to machines having two or more rotary rake heads which form a central windrow between two rotary rake heads which rotate to converge forward—seen in the direction of travel of the machine.

What is claimed is:

1. In a haymaking machine intended especially for the windrowing of fodder, comprising at least one rotary rake head driven in rotation about a substantially vertical axis, a plurality of tool-carrier arms on said rake head, said arms extending outwardly from adjacent said axis, a control mechanism carried by the machine to oscillate said arms about their longitudinal axes, and working tools on the arms which, under the action of said control mechanism, pivot over a partial zone of their trajectory upward and in the direction opposite the direction of rotation of the rotary rake head; the improvement comprising two covers, one of which is disposed above said control mechanism, the rotary rake head having a drive hub, said one cover being fixed to said drive hub, the other of said covers being disposed below said control mechanism and secured to said machine, and support bearings in which said arms are mounted for ivoting, said support bearings being wedged between said two covers.

2. A machine as claimed in claim 1, and a plurality of assembly elements which pass through said covers and said support bearings from side to side thereby to assemble said two covers and said support bearings together.

3. A machine as claimed in claim 2, said assembly elements being disposed substantially parallel to the axis of rotation of the rotary rake head.

4. A machine as claimed in claim 1, said rotary rake head having a support spindle, said lower cover being guided in rotation on said support spindle.

5. A machine as claimed in claim 4, said upper cover and said lower cover being substantially identical.

6. A machine as claimed in claim 1, and cross pieces wedged between the two covers and closing the spaces between adjacent said support bearings.

7. A machine as claimed in claim 1, and substantially vertical lugs on the outer edge of one of said covers, said lugs closing the spaces between adjacent said support bearings.

* * * * *